Patented June 29, 1954

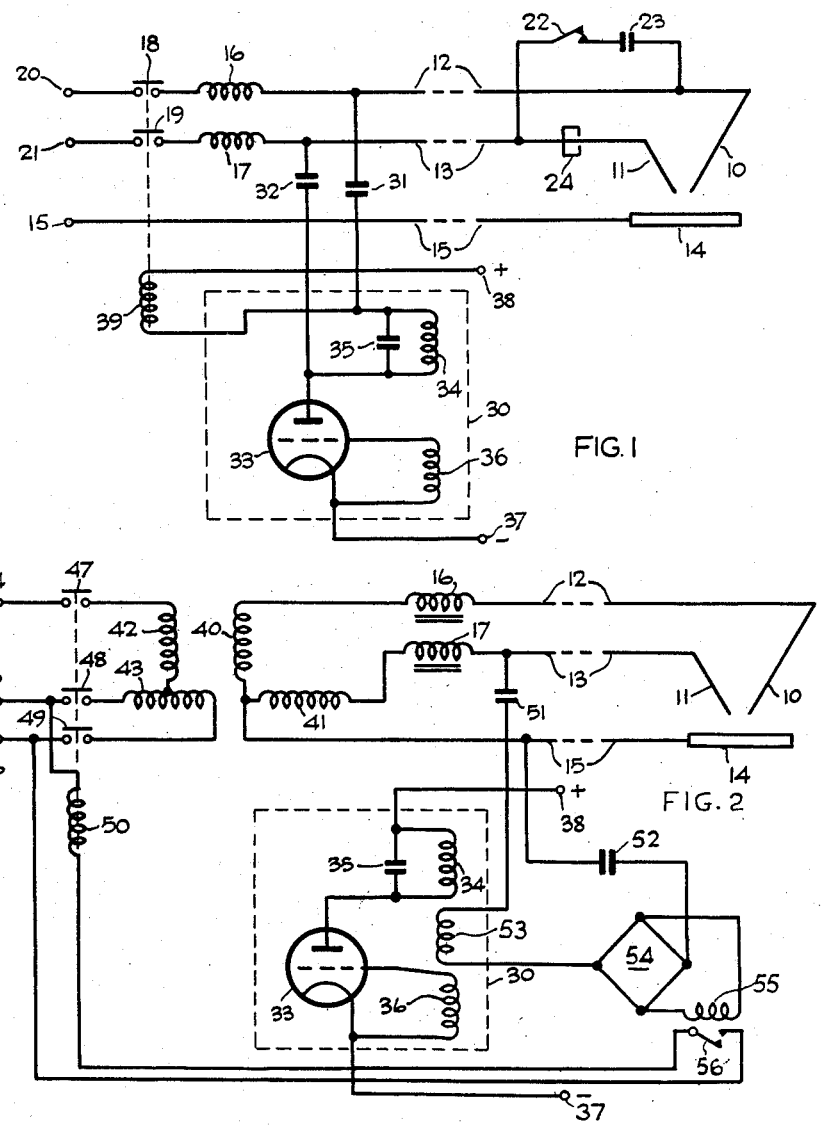

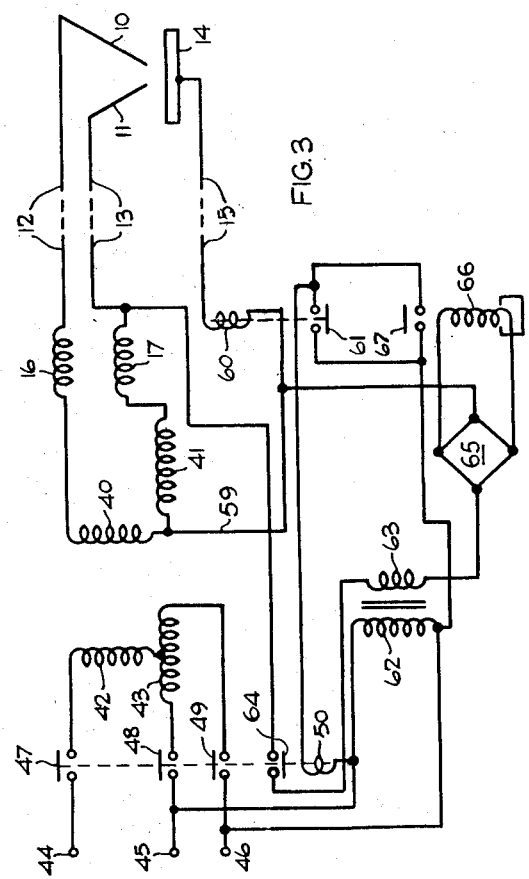

2,682,597

UNITED STATES PATENT OFFICE 2,682,597

WELDING APPARATUS AND WELDING SYSTEM

Ian Jack Pickering, Birmingham, England, assignor to The General Electric Company Limited, London, England Application October 10, 1951, Serial No. 250,596

Claims priority, application Great Britain October 12, 1950

5 Claims. (Cl. 219—8)

The present invention relates to welding apparatus and welding systems, and is especially concerned with means for controlling the supply of welding current to the welding electrodes.

According to the present invention, in welding apparatus for supplying welding current to one or more welding electrodes, the supply of welding current is controlled by a controlling signal fed over the same lines as the welding current. By the use of the same lines to carry the welding current and also the controlling signal, the use of pilot wires such as have been proposed, is avoided.

The control of the welding current supply can be effected either manually by means of a switch mounted on, or adjacent to, the welding electrode holder, or alternatively it may be effected automatically in response to the alteration of the conditions in the control circuit between the welding condition, during which a welding arc is maintained between the welding electrode or welding electrodes and the work, and the condition in which the welding arc or welding arcs is or are broken.

The controlling signal may be high frequency alternating current, the frequency being substantially higher than the frequency of the welding current supply if the welding current supply is alternating current. It is to be understood that instead of the use of an alternating current welding supply, a direct current welding supply may be used if desired. As an alternative to the use of high frequency alternating current for the controlling signal, means may be provided for applying a low voltage alternating current or direct current supply to provide the controlling signal responsive to the alteration in the conditions in the control circuit.

In one arrangement in accordance with the present invention which is especially applicable to arrangements in which two or more welding electrodes are supplied with welding current through separate lines the control signal is provided by superimposing high frequency alternating current on the welding current and providing a switch, for example in the holder for the welding electrodes, which is arranged to provide a short circuit for the high frequency signal but not for the welding current. This short circuit may advantageously be provided by connecting a capacitance between two of the lines to the welding electrodes, the value of the capacitance being such that it presents considerable impedance to the welding current which may be direct current, or if desired, alternating current at normal power frequency, but offers a negligible impedance at high frequency. The change in the reactance of the circuit at the high frequency, when the switch is closed or opened may be arranged to operate a contactor to reduce or cut off the welding supply. Such control may, for instance, be effected by means of a relay responsive to the anode current of a high frequency valve oscillator which is arranged to provide the high frequency supply. An arrangement of this type is especially applicable to two-phase arc welding in which two electrodes are fed through two lines from two phases of the welding supply, the neutral connection being made to the work. In such an arrangement the switch and capacitance may be connected in series between the two lines connected to the welding electrodes.

In another arrangement in accordance with the present invention, a high frequency signal is applied between a lead to the welding electrode or to one of the electrodes and the earth return lead. Under normal welding conditions the welding arc provides, in effect, a short circuit for the high frequency signal and, under these conditions, a contactor controlling the supply of welding current to the electrodes is kept closed. On removing the electrodes from the welding position and breaking the welding arc, the path for the high frequency signal from the electrode to the earth return is broken and, as the impedance of the welding transformer or other source of welding current for the high frequency signal is considerably greater, there will be a change in the impedance offered to the high frequency signal, which change of impedance can be utilised to cause the contactor to open to break the welding current. On re-establishing the welding arc or arcs the impedance offered to the high frequency signal will again be reduced to a low value and this can be arranged to re-close the contactor controlling the supply of welding current to the electrode or electrodes. With such an arrangement it can be arranged that the contactor breaks each phase line of the welding current supply either on the primary or on the secondary side of a welding transformer and, in this case, the only voltage appearing on the electrode or electrodes when welding is discontinued is the high frequency signal. Alternatively in a two-phase or polyphase system the contactor may be arranged to disconnect all the electrodes except one from the welding current supply or to reduce the voltage between the electrodes to a value insufficient to maintain the inter-electrode arc.

In a further alternative arrangement in accordance with the present invention which is especially applicable to systems in which a two-phase alternating current supply is arranged to have the two phase lines connected to the two electrodes and the neutral connected to the work, a relay connected in the neutral line may be arranged to maintain a contactor controlling the supply of welding current closed whenever current is flowing in the neutral line. When, however, the welding arcs between the electrodes and the work are broken the contactor is arranged to cut off the welding supply entirely and for this purpose contactors may be provided in each of the three-phase lines supplying the welding transformer or in the two lines which are connected to the welding electrodes. When the welding current supply is cut off a low voltage alternating or direct current supply, for example, at 6 volts, is applied between one or both of the electrodes and the work. Flow of current in this low voltage circuit is arranged to close the main contactor controlling the supply of welding current to the electrode or electrodes when the electrode or electrodes is or are brought into contact with the work preparatory to resuming the welding operation. An advantage of this method of control of the welding current supply is that the welding electrodes can, when welding is not in progress, be completely isolated from the welding current source and be connected only to the low voltage supply.

Three arrangements in accordance with the present invention as applied to the control of two-phase welding apparatus will now be described by way of example with reference to the accompanying drawings in which:

Figure 1 shows somewhat diagrammatically an arrangement in which a high frequency signal is applied to the two phase lines of the welding current supply and the control of the apparatus is effected by a switch mounted for example on the welding electrode holder.

Figure 2 shows somewhat diagrammatically an arrangement in which a high frequency signal is applied between one of the phase lines and the common return control being effected automatically by the making and breaking of the arc between one electrode and the work.

Figure 3 shows somewhat diagrammatically a further alternative arrangement in which a control signal is applied between one electrode and the common return when the welding supply has been cut off, the control signal being arranged automatically to reconnect the welding current supply when the electrodes are touched on the work to re-establish the welding condition.

In the arrangement shown in Figure 1, two welding electrodes 10 and 11 are supplied through two phase lines 12 and 13 while the work 14 is connected to the common return line 15. Welding current is supplied to the phase lines 12 and 13 through reactors 16 and 17, the supply of welding current being controlled by contactors 18 and 19 connected between the reactors 16 and 17 and a two-phase welding current supply connected to terminals 20 and 21. The common return of the welding current supply is connected to the common return line 15. A switch 22 is connected in series with a condenser 23 across the lines 12 and 13 so that when the switch 22 is closed the condenser 23 offers a relatively low impedance path for high frequency currents between the lines 12 and 13 while offering a considerable impedance to the two-phase welding current which may be at normal power frequencies of the order of 50 to 60 cycles per second.

A choke 24 may be provided to increase the impedance presented to the high frequency signal by the path through the welding electrodes 10 and 11.

A high frequency alternating current generator generally indicated at 30, is arranged to feed high frequency alternating current to the two phase lines 12 and 13 through condensers 31 and 32. In the arrangement shown the high frequency generator includes a valve oscillator comprising a valve 33 having an anode circuit comprising an inductance 34 tuned by the condenser 35 while the grid circuit includes an inductance 36 coupled to the inductance 34 to provide an appropriate degree of feedback to cause the arrangement to oscillate at the desired high frequency which may for example be of the order of 10,000 cycles per second or more. It will be appreciated that the circuit of the oscillator is only shown diagrammatically and that if desired it may include stabilising and/or anti-parasitic resistances and the like. The negative terminal 37 of a direct current high tension supply is connected to the cathode of the valve 33 while the positive terminal 38 of this high tension supply is connected to the end of the inductance 34 remote from the anode through the operating winding 39 for operating the contactors 18 and 19 controlling the supply of welding current to the phase lines 12 and 13.

When the switch 22 is open the impedance offered to the high frequency alternating current signal between the lines 12 and 13 is considerable, but when the switch 22 is closed the condenser 23 offers a relatively low impedance path between the lines so that the load presented to the high frequency oscillator is changed. In the arrangement shown the switch 22 is closed when it is desired to effect welding, the alteration in load on the high frequency oscillator being arranged to increase the anode current drawn by the valve 33 so that the operating winding 39 causes the contactors 18 and 19 to close thereby connecting the welding current supply from the terminals 20 and 21 to the electrodes 10 and 11. The contactors 18 and 19 are maintained closed so long as the switch 22 is closed. When the switch 22 is opened the anode current drawn by the valve 33 is reduced so that the operating winding 39 carries less current and allows the contactors 18 and 19 to open thereby cutting off the welding current supply. It will be appreciated that it is possible under certain conditions of operation to arrange that when the output from the high frequency oscillator is shunted by a low impedance path provided by a condenser such as 23 the anode current decreases. In this case the operating winding 39 may be arranged to effect opening of the contactors 18 and 19 if desired through an intermediate relay. If desired also it can be arranged that the switch 22 is closed only when it is desired to stop welding, the change in load on the high frequency oscillator in this case being arranged to open the contactors 18 and 19. It will be appreciated that, alternatively, if desired the contactors such as 18 and 19 can be arranged in the primary circuit of a welding current transformer which is arranged to provide the welding current supply.

In the arrangement shown in Figure 2 a two-phase welding current supply is provided by a Scott-connected transformer having two secondary windings 40 and 41 which are arranged to supply two-phase welding current to the electrodes 10 and 11 through the reactors 16 and 17 and the two phase lines 12 and 13. The common return line 15 connected to the work 14 is connected to the joined ends of the secondary windings 40 and 41. The primary windings 42 and 43 of the Scott-connected transformer are connected to three-phase alternating current supply terminals 44, 45 and 46 through contactors 47, 48 and 49 respectively. The contactors 47, 48 and 49 have a common operating winding 50.

A high frequency oscillator 30 somewhat similar to the oscillator described with reference to Figure 1 is arranged to apply a high frequency signal between the phase line 13 and the common return line 15, the signal being obtained from an output winding 53 one end of which is connected through a condenser 51 to the phase line 13, while the other end is connected through the alternating current terminals of a bridge connected rectifier 54 and a condenser 52 to the common return line 15. The direct current terminals of the rectifier 54 are connected to the operating winding 55 of a relay having normally open contacts 56 connected to control the supply of alternating current from the supply terminals 45 and 46 to the operating winding 50 of the contactors 47, 48 and 49.

In operation the load on the high frequency oscillator 30 alters between the welding and the non-welding condition. When a welding arc is maintained between the electrodes 10 and 11 and the work 14 the arc path provides a path for the high frequency signal which offers substantially less impedance to the signal than the circuit through the reactor 17 and secondary winding 41. Similarly, a low impedance path is provided when the electrode 11 is touched on the work 14 preparatory to re-establishing the welding condition. When such a low impedance path is provided, the increase in the high frequency output current energises the operating winding 55 through the rectifier 54 and closes the contacts 56 to energise the operating winding 50 to make the contactors 47, 48 and 49 close thereby applying the welding current supply through the Scott-connected transformer to the welding electrodes. When the electrode 11 is removed from the welding position and the welding arc is broken the impedance of the load connected to the high frequency oscillator 30 is increased so that the output current decreases causing the operating windings 55 and 50 to be de-energised to allow the contactors 47, 48 and 49 to open thereby cutting off the welding current supply.

While the arrangement shown in Figure 2 has been described as applied to a two-phase welding arrangement it will be appreciated that a somewhat similar control arrangement may be applied to single phase or direct current welding, the high frequency signal being applied between the welding current line and the return line.

With an arrangement such as that shown in Figure 2 it can be arranged that the contactors such as 47, 48 and 49 break each phase line of the welding curent supply either on the primary or on the secondary side of a welding transformer and in this case the only voltage appearing on the electrode or electrodes when welding is discontinued is the high frequency signal. Alternatively, in a two-phase or polyphase system the contactors may be arranged to disconnect all the electrodes except one from the welding current supply or to reduce the voltage between the electrodes to a value insufficient to maintain the inter-electrode arc. Such reduction in voltage between the electrodes may be effected in the case of a two-phase welding current supply obtained from a Scott-connected transformer by disconnecting one end of the centre tapped primary winding from the alternating current supply.

In a further arrangement in accordance with the present invention shown in Figure 3, a two-phase welding current supply is obtained from the secondary windings 40 and 41 of a Scott-connected transformer, the welding current circuit being very similar to that above described with reference to Figure 2 except that the operating winding 60 of a relay having normally open contacts 61 is connected between the common return line 15 and a line 59 connected to the junction of the secondary windings 40 and 41 of the Scott-connected transformer. As in the arrangement shown in Figure 2, the supply of three-phase alternating current from supply terminals 44, 45 and 46 to the primary windings 42 and 43 of the Scott-connected transformer is controlled by three normally open contactors 47, 48 and 49 which have a common operating winding 50 with auxiliary normally closed contacts 64.

A low voltage alternating current supply for control purposes is obtained from a transformer having a primary winding 62 which is arranged to be connected between the terminals 45 and 46 of the three-phase alternating current supply and a secondary winding 63 which is arranged to give a low voltage, for instance of the order of six to ten volts. This low voltage alternating current supply from the secondary winding 63 is applied through the auxiliary contacts 64 and the path between the phase line 13 and the common return line 59 to a bridge connected rectifier 65 the direct current terminals of which feed the operating winding 66 of a relay having normally open contacts 67 connected in parallel with the contacts 61. The relay with the operating winding 66 is slugged to make it slow in operation. During welding, welding current flowing through the operating winding 60 connected in the common return line causes the contacts 61 to close so as to complete the circuit from the alternating current supply to the operating winding 50 thereby maintaining the contactors 47, 48 and 49 closed and maintaining the contacts 64 open. When welding is discontinued by moving the electrodes 10 and 11 away from the work 14 so as to break the welding arcs between them and the work, the current ceases to flow in the common return line so that the operating winding 60 of the relay is de-energised allowing the contacts 61 to open and thereby de-energising the operating winding 50 and allowing the contactors 47, 48 and 49 to open to disconnect the welding current supply. At the same time, the contacts 64 close so that the low voltage supply providing the control signal is connected to the phase line 13 connected to the electrode 11. Thus a low voltage signal is applied to the electrode 11 but the current flowing from the secondary winding 63 through the rectifier 65 and thence to the operating winding 66 is small owing to the relatively large impedance offered to this signal by the reactor 17 and secondary winding 41. When the welding electrode 11 is touched on the work 14 to re-establish the welding condition, however, the impedance is accordingly reduced so that the current flowing through operating winding 66 rises to a value sufficient to close the contacts 67 to cause the contactors 47, 48 and 49 to close and apply the normal welding current supply to the electrodes 10 and 11. This causes the flow of current through the operating winding 60 which closes the contacts 61 so that the operating winding 50 is maintained energised. An advantage of this arrangement for controlling the welding current supply is that the welding electrodes can, when welding is not in progress, be isolated from the welding current source and be connected only to a low voltage supply. If desired, the low voltage alternating current supply obtained from the secondary winding 63 can be replaced by a direct current supply in which case the rectifier 65 can be omitted.

A control arrangement similar to that described with reference to Figure 3 may be used for the control of welding current supplied to a single electrode arranged to be fed with alternating or direct current.

As an alternative to feeding the controlling signal between one phase line and the common return it can be fed between two phase lines.

I claim:
1. Apparatus for controlling the supply of welding current to a welding electrode comprising a contactor for connecting and disconnecting the welding current supply, a relay responsive to the current in the welding circuit arranged to control the operation of said contactor, contacts for connecting a low voltage supply to said welding electrode when the welding supply is disconnected arranged to be controlled by said relay, and relay means responsive to a flow of current in the low voltage supply circuit between said welding electrode and the work for operating said contactor to connect the welding current supply.

2. Apparatus for controlling the supply of welding current to a welding electrode comprising a contactor for connecting and disconnecting the welding current supply, a relay responsive to the current in the welding circuit arranged to control the operation of said contactor to disconnect the supply of welding current when the current in the welding circuit ceases, contacts on said contactor for connecting a low voltage supply to said welding electrode when the welding supply is disconnected, and relay means responsive to a flow of curent in the low voltage supply circuit between said welding electrode and the work for operating said contactor to reconnect the welding current supply.

3. Apparatus for controlling the supply of welding current to two electrodes in a two-phase welding current supply system in which the two phase lines are connected to two electrodes and the work is connected to the common return line comprising a contactor for connecting and disconnecting the welding current supply, a relay responsive to the current in the common return line arranged to control the operation of said contactor, contacts on said contactor for connecting a low voltage supply to one of the electrodes when the welding supply is disconnected, and relay means responsive to a flow of current in the low voltage supply circuit between said electrode and the work for operating said contactor to connect the welding current supply and disconnect the low voltage supply.

4. Apparatus according to claim 3 wherein the relay means responsive to the flow of current in the low voltage supply circuit is arranged to be slow in release.

5 Apparatus for two-phase welding comprising a Scott-connected transformer having primary windings for connection to a three-phase alternating current supply and secondary windings for providing a two-phase supply, the two phase lines being connected to two electrodes and the common return line to the work, a contactor having contacts for connecting said primary windings to a three-phase alternating current supply, a relay responsive to the current in the common return line arranged to control the operation of said contactor to disconnect the three-phase supply from the primary windings when the flow of current in the common return line ceases, a low voltage supply, contacts on said contactor for connecting said low voltage supply to one of the electrodes when the three-phase alternating current supply is disconnected from said primary windings, and relay means including a slugged relay providing slow release responsive to a flow of current in the low voltage supply circuit between said electrode and the work for operating said contactor to reconnect the three-phase alternating current supply to the primary windings when current flows in said low voltage supply circuit.

References Cited in the file of this patent

UNITED STATES PATENTS

| Number | Name | Date |
| --- | --- | --- |
| 1,610,920 | Bethenod | Dec. 14, 1926 |
| 2,128,671 | Drenkard, Jr. | Aug. 30, 1938 |
| 2,150,430 | Drenkard, Jr. | Mar. 14, 1939 |
| 2,364,372 | Kenrick | Dec. 5, 1944 |
| 2,486,165 | Journeaux | Oct. 25, 1949 |
| 2,554,467 | MacGeorge | May 22, 1951 |
| 2,583,507 | Carpenter et al. | Jan. 22, 1952 |